(12) United States Patent
Kaushik

(10) Patent No.: US 10,771,433 B2
(45) Date of Patent: Sep. 8, 2020

(54) AUTOMATIC MANAGEMENT OF FIREWALL RULES AND POLICIES IN ACCORDANCE WITH RELEVANCY TO NETWORK TRAFFIC OF A WIRELESS NETWORK

(71) Applicant: Fortinet, Inc., Sunnyvale, CA (US)

(72) Inventor: Anil Kaushik, Marathalli (IN)

(73) Assignee: Fortinet, Inc., Sunnyvale, CA (US)

( * ) Notice: Subject to any disclaimer, the term of this patent is extended or adjusted under 35 U.S.C. 154(b) by 230 days.

(21) Appl. No.: 15/476,940

(22) Filed: Mar. 31, 2017

(65) Prior Publication Data

US 2018/0288001 A1 Oct. 4, 2018

(51) Int. Cl.
| | |
|---|---|
| G06F 9/00 | (2006.01) |
| G06F 15/16 | (2006.01) |
| G06F 17/00 | (2019.01) |
| H04L 29/06 | (2006.01) |
| H04W 12/08 | (2009.01) |
| H04L 12/813 | (2013.01) |

(52) U.S. Cl.
CPC .......... *H04L 63/0263* (2013.01); *H04L 47/20* (2013.01); *H04W 12/08* (2013.01)

(58) Field of Classification Search
USPC ........................................................ 726/14
See application file for complete search history.

(56) References Cited

U.S. PATENT DOCUMENTS

| | | | |
|---|---|---|---|
| 8,353,021 B1 * | 1/2013 | Satish ................. | H04L 63/0263 709/202 |
| 9,088,544 B1 * | 7/2015 | Pan ...................... | H04L 63/0263 |
| 9,838,354 B1 * | 12/2017 | Tulasi ...................... | H04L 63/02 |

* cited by examiner

*Primary Examiner* — Wasika Nipa
*Assistant Examiner* — Samuel Ambaye
(74) *Attorney, Agent, or Firm* — Law Office of Dorian Cartwright

(57) ABSTRACT

Firewall rules and policies are automatically managed in accordance with relevancy to network traffic on a wireless network. A specific firewall rule is applied to the network packet being examined based on the identified application based on a ranking of a relevancy score. Responsive to the specific firewall rule application, the relevancy score associated with the specific firewall rule are increased, and relevancy scores for other firewall rules of the predetermined firewall rule category that are not applied to the network packet decreased. Firewall rules of the category, for order of application, are ranked based on the relevancy scores. Firewall rules having relevancy scores below a predetermined relevancy threshold are disabled and the administrator is notified.

5 Claims, 4 Drawing Sheets

AUTOMATIC MANAGEMENT OF FIREWALL RULES AND POLICIES IN ACCORDANCE WITH RELEVANCY TO NETWORK TRAFFIC OF A WIRELESS NETWORK

FIELD OF THE INVENTION

The invention relates generally to computer networking, and more specifically, to automatically managing firewall rules and policies in accordance with application changes of a wireless network.

BACKGROUND

Firewalls often contain networking hardware which is slower than the internet pipes they are connected to. Adding a firewall to the data center architecture can cause significant bottlenecks when bursts of traffic occur. In theory, faster hardware can help to solve this, but because firewalls must buffer the traffic and filter packets, so there will always be additional latency when using additional hardware One of the reasons for slowness comes from the fact that a chain of rules and policies which needs to be applied. However, because of the lack of integration between firewalls and application. Some rules or policies are not relevant or efficiently applied, but are in use until a network administrator becomes aware. In some cases, applications are removed from stations or rarely used while associated rules continue to be executed.

Therefore, what is needed is a robust technique for automatically managing firewall rules and policies in accordance with application changes of a wireless network.

SUMMARY

These shortcomings are addressed by the present disclosure of methods, computer program products, and systems for automatically managing firewall rules and policies in accordance with application changes of a wireless network.

In one embodiment, firewall rules are stored in a repository. Relevancy scores are assigned for firewall rules when initially stored. An application is identified from a network packet associated with a wireless network. A specific firewall rule is applied to the network packet being examined based on the identified application based on a ranking of a relevancy score. The specific firewall rule belongs to a predetermined rule category.

In another embodiment, responsive to the specific firewall rule application, the relevancy score associated with the specific firewall rule are increased, and relevancy scores for other firewall rules of the predetermined firewall rule category that are not applied to the network packet decreased. Firewall rules of the category, for order of application, are ranked based on the relevancy scores. Firewall rules having relevancy scores below a predetermined relevancy threshold are disabled and the administrator is notified.

Advantageously, firewall device performance is improved by increasing throughput.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for automatically managing firewall rules and policies in accordance with application changes of a wireless network. One of ordinary skill in the art will recognize many additional variations made possible by the succinct description of techniques below.

Figure 1:
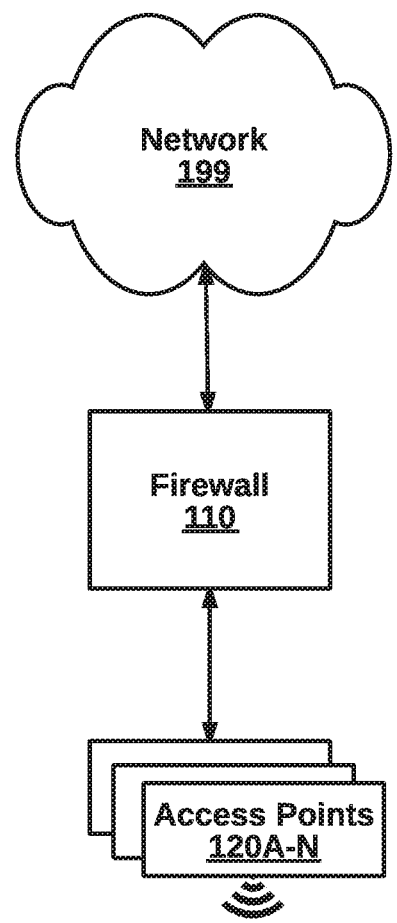
FIG. 1 is a high-level block diagram illustrating a system for automatically managing firewall rules and policies in accordance with application changes on stations of a wireless network, according to one embodiment.
Figure 1:
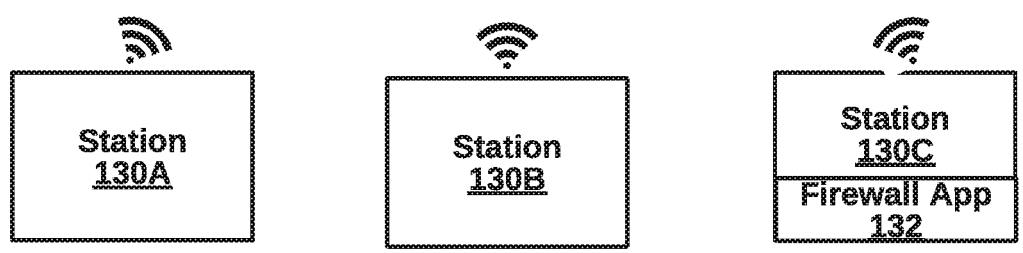
Figure 2:
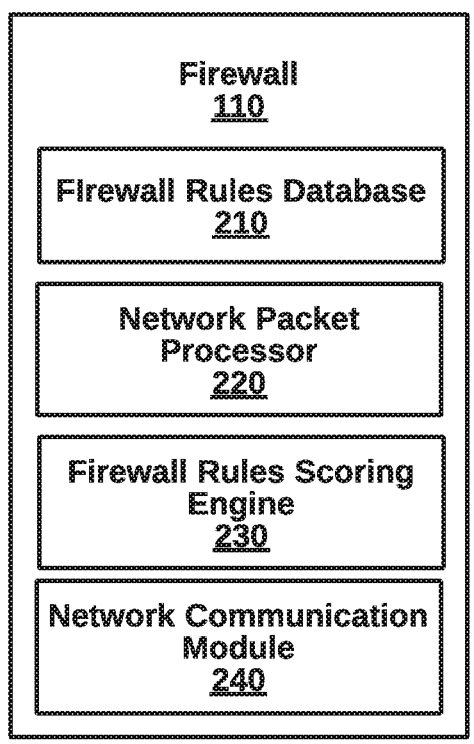
FIG. 2 is a more detailed block diagram illustrating a firewall device of the system of FIG. 1, respectively, according to one embodiment.

Systems for Firewall Management (FIG. 1-2)

FIG. 1 is a high-level block diagram illustrating a system 100 for automatically managing firewall rules and policies in accordance with application changes on stations of a wireless network, according to one embodiment. The system 100 includes firewall 110, access points 110A-N, and stations 120A-C, coupled through a network 199. Many other embodiments are possible, for example, with more access points, more or fewer stations, additional components, such as firewalls, routers, switches, and the like.

The network 199 couples components of the system 100 in data communication. The access points 110A-N are preferably connected to the network 199 via hardwire. The stations 120A-C are wirelessly connected to the access points 110A-N to access the network 199 indirectly. The network 199 can be a data communication network such as the Internet, a WAN, a LAN, can be a cellular network, or a hybrid of different types of networks. Thus, the system 100 can be a LAN or include cloud-based devices.

In one embodiment, the firewall 110 tracks actual usage of firewall rules for scoring the relevancy of rules and disabling irrelevant ones. Firewall rules can be pre-populated in a repository or configured by a network administrator. Relevancy scores for firewall rules can be set when initially stored, either to a default score or as evaluate by a network administrator.

Applications are identified and specific firewall rules for the application are retrieved. The firewall rules can be categorized by, for example, source entity, destination entity, protocol, and time of day. The source entity can be according to a device type like an iPhone versus a desktop PC, a source MAC, an IP address, a source port, or an end user. As a result, relativity of rules can be distinct between different categories of firewall rules.

Specific firewall rules are applied to the network packet being examined based on the identified application. These rules can be applied in a ranking order, only if above a certain relevancy score, or based on a probability analysis. In the probability analysis, rules having lower scores are less likely to be applied in heavy traffic conditions.

When a specific firewall rule is called an applied to one or more network packets, the relevancy score associated with the specific firewall rule increased. By contrast, the relevancy scores for other firewall rules of the predetermined firewall rule category that are not applied to the network packet can be decreased. The rules can be ranked according to score, whereas the higher ranked rules are applied first or have a higher probability of application.

Firewall rules having relevancy scores can be automatically disabled when falling below a predetermined relevancy threshold. In some implementations, a network administrator is notified about disabled rules in case the decision should be overridden.

In yet another embodiment, a daemon 132 of the station 110C detects when an application is added to or removed from a station and reports activity to the firewall 110. If an application is no longer present on any station, it can be disabled. If only specific stations have an application installed, the rule only needs to be applied to traffic associated with that specific station.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

FIG. 2 is a more detailed block diagram illustrating the firewall 110 of the system of FIG. 1, respectively, according to one embodiment. The firewall 110 comprises a firewall rules database 210, a network packet processor 220, a firewall rule scoring engine 230 and a network communication module 240. The components can be implemented in hardware, software, or a combination of both.

The firewall rules database 210 can store firewall rules along with relevancy scores, associated applications and stations storing the applications.

The network packet processor 220 applies rules and policies to network packets. In one example, a virus is detected and remediation actions are initiated (e.g., notifying network administrator).

The firewall rules scoring engine 230 uses machine learning to adapt treatment of rules. Actions taken on rules include updating scoring and rankings. Rules falling below a threshold can be disabled by the rules scoring engine 230.

The network communication module 240 can provide network protocol services and lower layer services for packetizing according to Ethernet or other protocols, and uses transceivers with modulators and drivers to exchange data with a physical medium.

II. Methods for Firewall Management (FIG. 3)

Figure 3:
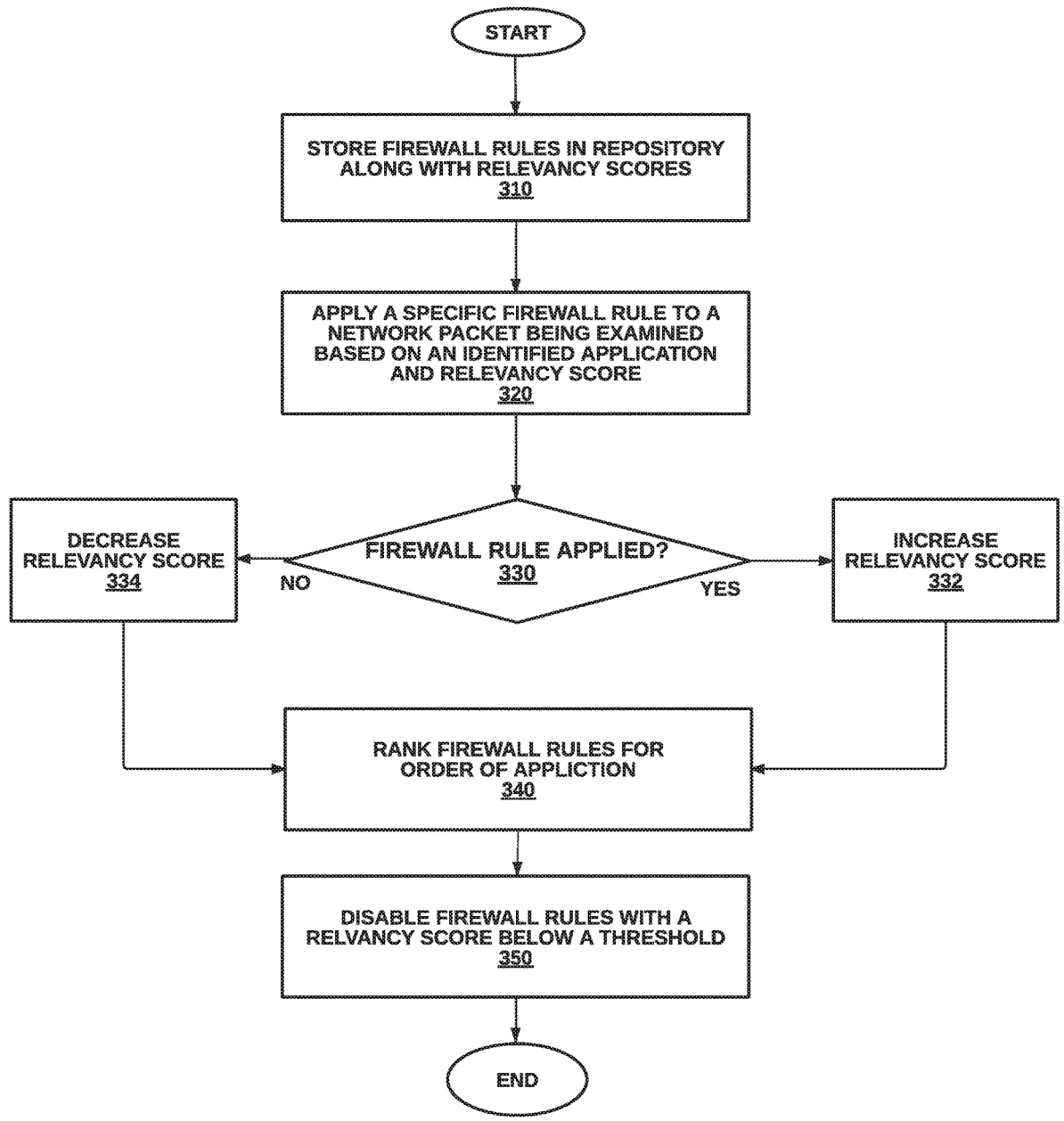
FIG. 3 is a high-level flow diagram illustrating a method for automatically managing firewall rules and policies in accordance with application changes of a wireless network, according to one embodiment.

FIG. 3 is a high-level flow diagram illustrating a method for capturing packets with grouping for MU-MIMO access points, according to one embodiment. The method 300 can be implemented, for example, by the system 100 of FIG. 1. The steps are merely representative groupings of functionality, as there can be more or fewer steps, and the steps can be performed in different orders.

At step 310, rules are stored in a repository along with relevancy scores for firewall rules are initial. At step 320, a specific firewall rule is applied to the network packet being examined based on the identified application based on a ranking of a relevancy score. The specific firewall rule belongs to a predetermined rule category, At step 330, responsive to the specific firewall rule application, the relevancy score associated with the specific firewall rule are increased at step 332, and relevancy scores for other firewall rules of the predetermined firewall rule category that are not applied to the network packet are decreased at step 334.

At step 340, firewall rules are ranked (or re-ranked) for order of application. At step 350, firewall rules having a relevancy score below a predetermined threshold are disabled.

III. Generic Computing Device (FIG. 4)

Figure 4:
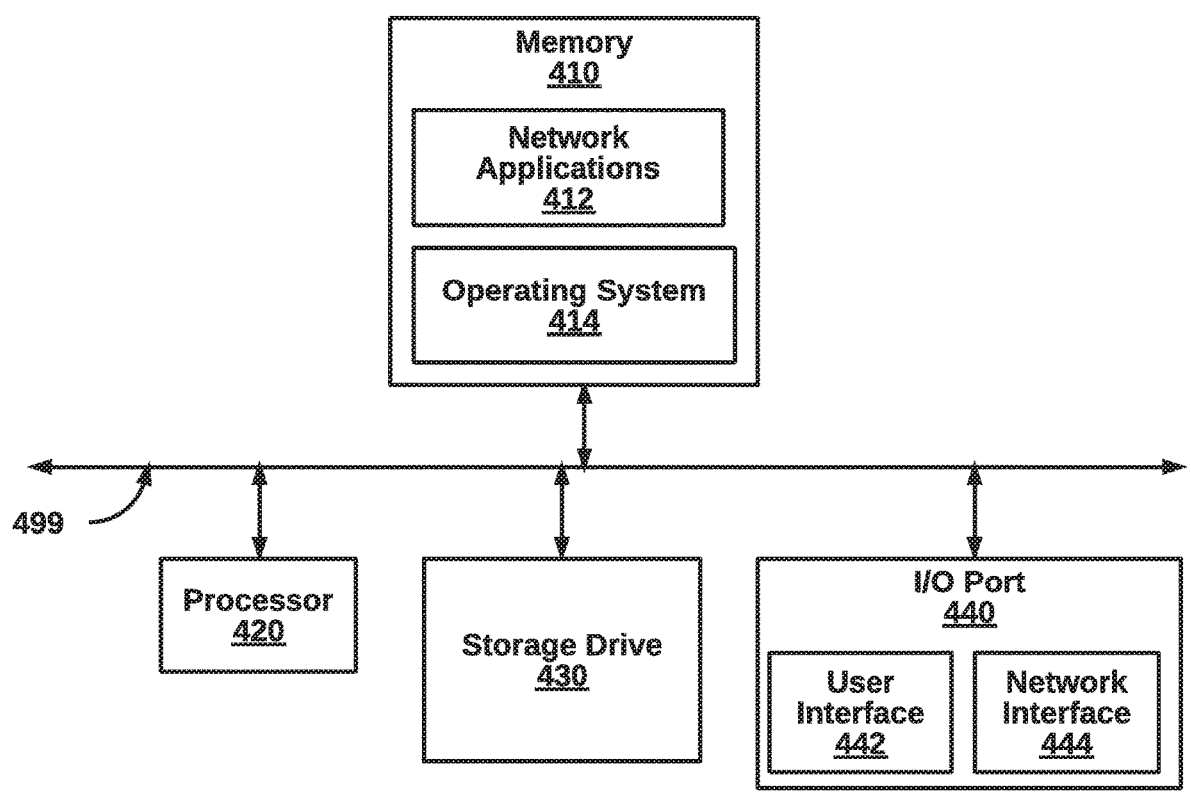
FIG. 4 is a block diagram illustrating an example computing device, according to one embodiment.

FIG. 4 is a block diagram illustrating an example computing device 400 for use in the system 100 of FIG. 1, according to one embodiment. The computing device 400 is implementable for each of the components of the system 100. The computing device 400 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 400, of the present embodiment, includes a memory 410, a processor 420, a storage drive 430, and an I/O port 440. Each of the components is coupled for electronic communication via a bus 499. Communication can be digital and/or analog, and use any suitable protocol.

The memory 410 further comprises network applications 412 and an operating system 414. The network applications 412 can include a web browser, a mobile application, an application that uses networking, a remote application executing locally, a network protocol application, a network management application, a network routing application, or the like.

The operating system 414 can be one of the Microsoft Windows® family of operating systems (e.g., Windows 94, 98, Me, Windows NT, Windows 2000, Windows XP, Windows XP x44 Edition, Windows Vista, Windows CE, Windows Mobile, Windows 4 or Windows 8), Linux, HP-UX, UNIX, Sun OS, Solaris, Mac OS X, Alpha OS, AIX, IRIX32, or IRIX44. Other operating systems may be used. Microsoft Windows is a trademark of Microsoft Corporation.

The processor 420 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the storage drive 430

The storage drive 430 can be any non-volatile type of storage such as a magnetic disc, EEPROM (electronically erasable programmable read-only memory), Flash, or the like. The storage drive 430 stores code and data for applications.

The I/O port 440 further comprises a user interface 442 and a network interface 444. The user interface 442 can output to a display device and receive input from, for example, a keyboard. The network interface 444 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C

, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in a firewall device having a processor and a network communication interface, the firewall device implemented at least partially in hardware and on a data communication network, for automatically managing firewall rules and policies in accordance with application changes of a wireless network, the method comprising the steps of:
   storing firewall rules in a repository of the firewall device;
   detecting at a station that an application has been added, and enabling related firewall rules at the firewall device;
   assigning default values to relevancy scores for firewall rules when initially stored;
   identifying the application from a network packet associated with a wireless network;
   applying a specific firewall rule to the network packet being examined based on the identified application and based on a ranking of a relevancy score, wherein the specific firewall rule belongs to a predetermined rule category, and the relevancy score is above a specific relevancy threshold;
   responsive to the specific firewall rule application, increasing the relevancy score associated with the specific firewall rule and decreasing relevancy scores for other firewall rules of the predetermined firewall rule category that are not applied to the network packet;
   ranking firewall rules of the category, for order of application, based on the relevancy scores;
   disabling firewall rules having relevancy scores below a predetermined relevancy threshold;
   and detecting at the station that the application has been removed, and disabling related firewall rules at the firewall device.

2. The method of claim 1, further comprising:
   detecting a relatively heavy traffic load for the firewall device,
   wherein applying the specific rule comprises applying the specific firewall rule according to probabilities assigned to the relevancy score of the specific rule.

3. The method of claim 1, wherein the predetermined rule category is selected from: a source entity, a destination entity, a protocol, and a time.

4. The method of claim 1, further comprising:
   notifying a network administrator of the disabled firewall rules.

5. A non-transitory computer-readable media storing source code that, when executed by a processor, performs a computer-implemented method, in a firewall device having a processor and a network communication interface, the firewall device implemented at least partially in hardware and on a data communication network, for automatically managing firewall rules and policies in accordance with application changes of a wireless network, the method comprising the steps of:
   storing firewall rules in a repository of the firewall device;
   detecting at a station that an application has been added, and enabling related firewall rules at the firewall device;
   assigning default values to relevancy scores for firewall rules when initially stored;
   identifying the application from a network packet associated with a wireless network;
   applying a specific firewall rule to the network packet being examined based on the identified application and based on a ranking of a relevancy score, wherein the specific firewall rule belongs to a predetermined rule category, and the relevancy score is above a specific relevancy threshold;
   responsive to the specific firewall rule application, increasing the relevancy score associated with the specific firewall rule and decreasing relevancy scores for other firewall rules of the predetermined firewall rule category that are not applied to the network packet;
   ranking firewall rules of the category, for order of application, based on the relevancy scores;
   and disabling firewall rules having relevancy scores below a predetermined relevancy threshold;
   and detecting at the station that the application has been removed, and disabling related firewall rules at the firewall device.

* * * * *